(12) United States Patent
Jeong et al.

(10) Patent No.: US 9,378,586 B2
(45) Date of Patent: Jun. 28, 2016

(54) METHOD OF SMART GRADING BASED ON PARAMETERIZED DRAFT

(71) Applicants: Moonhwan Jeong, Seoul (KR); Hyeong-Seok Ko, Seoul (KR)

(72) Inventors: Moonhwan Jeong, Seoul (KR); Hyeong-Seok Ko, Seoul (KR)

(73) Assignee: SEOUL NATIONAL UNIVERSITY INDUSTRY FOUNDATION, Bongchun-Dong, Gwanak-Gu, Seoul (KR)

( * ) Notice: Subject to any disclaimer, the term of this patent is extended or adjusted under 35 U.S.C. 154(b) by 142 days.

(21) Appl. No.: 14/187,119

(22) Filed: Feb. 21, 2014

(65) Prior Publication Data

US 2015/0243076 A1    Aug. 27, 2015

Related U.S. Application Data

(60) Provisional application No. 61/767,711, filed on Feb. 21, 2013.

(51) Int. Cl.
*G06T 15/00*    (2011.01)
*G06T 17/20*    (2006.01)
*A41H 1/00*    (2006.01)

(52) U.S. Cl.
CPC . *G06T 17/20* (2013.01); *A41H 1/00* (2013.01); *G06T 2210/16* (2013.01)

(58) Field of Classification Search
CPC ....... G06T 17/20; G06T 2210/16; A41H 1/00
USPC ................................. 345/419, 423, 428, 619
See application file for complete search history.

(56) References Cited

U.S. PATENT DOCUMENTS

| | | | | | |
|---|---|---|---|---|---|
| 6,310,627 | B1 * | 10/2001 | Sakaguchi | ............. | A41H 3/007 345/630 |
| 7,385,601 | B2 * | 6/2008 | Bingham | ............... | A41H 3/007 345/419 |
| 7,656,402 | B2 * | 2/2010 | Abraham | ............... | G06Q 30/06 345/419 |
| 7,859,551 | B2 * | 12/2010 | Bulman | ................. | G06Q 30/00 345/428 |
| 8,674,989 | B1 * | 3/2014 | Dalal | ....................... | G06T 15/50 345/419 |
| 8,704,823 | B1 * | 4/2014 | Waggoner | ............... | G06T 13/00 345/419 |
| 8,970,585 | B2 * | 3/2015 | Weaver | .................. | A41H 3/007 345/419 |

* cited by examiner

*Primary Examiner* — Phu K Nguyen
(74) *Attorney, Agent, or Firm* — John K. Park; Park Law Firm

(57) ABSTRACT

An automatic garment grading is provided. A retargeting technique is used with the mediator and the correspondence function. The mediator is a parameterized draft. Local coordinates systems are used for making correspondence. The mean value coordinates system (MVC) are improved so that the weights would have positive values, which is omitted mean value coordinates (OMVC). The mediator is parameterized draft, and correspondence function is the OMVC in the method. Smart grading can minimize designer's specialized know-how and save performing time for the grading of real garment and virtual garment.

11 Claims, 26 Drawing Sheets

(a) Type 1

(b) Type 2

(c) Type 3

(a) Draft  (b) Panels (a) MVC    (b) HC    (c) OMVC    (d) OMVC subdivided (a) Source Body (b) Target Body 1

(c) Target Body 2

(d) Target Body 3

(a) Source Draft (b) Draft 1

(c) Draft 2

(d) Draft 3

(a) Draping      (b) Panels (a) Sleeve draft

| PBS (unit:cm) | Source | Target 1 | Target 2 | Target 3 |
|---|---|---|---|---|
| Front Armhole Circumference | 21 | 19 | 23 | 23 |
| Rear Armhole Circumference | 24 | 22 | 26 | 26 |
| Sleeve Length | 29 | 25 | 25 | 32 |
| Wrist Circumference | 14 | 12 | 16 | 15 |

(b) Primary body sizes

METHOD OF SMART GRADING BASED ON PARAMETERIZED DRAFT

RELATED APPLICATION

This application is a non-provisional application corresponding to Provisional U.S. Patent Application Ser. No. 61/767,711 for "METHOD OF SMART GRADING BASED ON PARAMETERIZED DRAFT" filed on Feb. 21, 2013.

BACKGROUND OF THE INVENTION

The present invention relates to a fast and automatic method for garment grading.

Accordingly, a need for a fast and automatic garment grading has been present for a long time. This invention is directed to solve these problems and satisfy the long-felt need.

SUMMARY OF THE INVENTION

The present invention contrives to solve the disadvantages of the prior art.

An object of the invention is to provide a smart grading based on parameterized draft.

A method of smart grading based on parameterized draft, the method comprises steps for:

constructing source drafts D(A), which is decided from primary body sizes (PBSs) of a source body A;

positioning a set of source panels P(A) on the source drafts D(A);

encoding draft-space by making correspondence between source draft vertices, $v_i$, and each panel vertex, $P_j$, wherein $P_j$ is represented by a linear combination of the source draft vertices $v_i$, $$P_j = \Sigma_{i=1}^k \lambda_i v_i, i \in D(A)$$

where $\lambda_i$, is a set of weight function obtained by using an omitted mean value coordinates (OMVC);

constructing a target draft D(B) having target draft vertices, $\hat{v}_i$, according to the PBSs of a target body B and designed to fit the target body B;

decoding draft-space by transferring the source panel vertices $P_j$ to fit the target draft D(B), obtaining graded panel vertices, $\tilde{P}_j$, which are transferred through the linear combination of $\hat{v}_i$ with the same set of weight function $\lambda_i$ $$\tilde{P}_j = \Sigma_{i=1}^k \lambda_i \hat{v}_i$$

as in the step for encoding draft-space; and storing the obtained graded panel vertices, $\tilde{P}_j$ in an information storage device, wherein each of the drafts and the panels is two(2)-dimensional.

The source drafts D(A) may be parameterized drafts obtained using a draft constructor.

The PBSs may comprise bust circumference, waist circumference, hip circumference, waist back length, bust point to bust point, and neck point to breast point for constructing a parameterized draft for a bodice, wherein the PBSs comprise other predetermined sizes for constructing parameterized drafts for other body parts.

Each of the source panels may be represented by a collection of points and lines on a given coordinate system.

The source drafts D(A) may be decided further from garment types and gender in addition to from the primary body sizes (PBSs) of the source body A.

The omitted mean value coordinates (OMVC) may be configured so that when a position P on a plane defined by vertices $(v_1, v_2, \ldots v_N)$ is encoded as a linear combination of the vertices as $$P_j = \Sigma_{i=1}^N \lambda_i v_i$$

with $$\Sigma_{i=1}^N \lambda_i = 1,$$

where $\lambda_i = 0$ if $v_i$ is invisible from the position P.

The weight function $\lambda_i$ may be calculated by a mean value coordinates scheme.

When P, exterior to the plane, is located outside a convex hull and close to a draft vertex, the method may further comprise a step for extending the plane by introducing a ghost vertex such that P lies inside the extended plane and then applying the omitted mean value coordinates (OMVC).

The ghost vertex may be disposed at a position which is symmetric to the nearest vertex with respect to P.

When P, exterior to the plane, is located outside a convex hull and close to an edge of the plane, the method may further comprise a step for extending the plane by introducing a ghost vertex $v_g$ such that P lies inside the extended plane and then applying the omitted mean value coordinates (OMVC).

The ghost vertex may be disposed at an inner-division vertex of a ghost edge $(v_x', v_y')$ which is point-symmetric to a spanning edge $(v_x, v_y)$ with respect to P, such that the ratio $(v_x', v_g):(v_y', v_g)$ is equal to the ratio $(v_x', P):(v_y', P)$.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Figure 1:
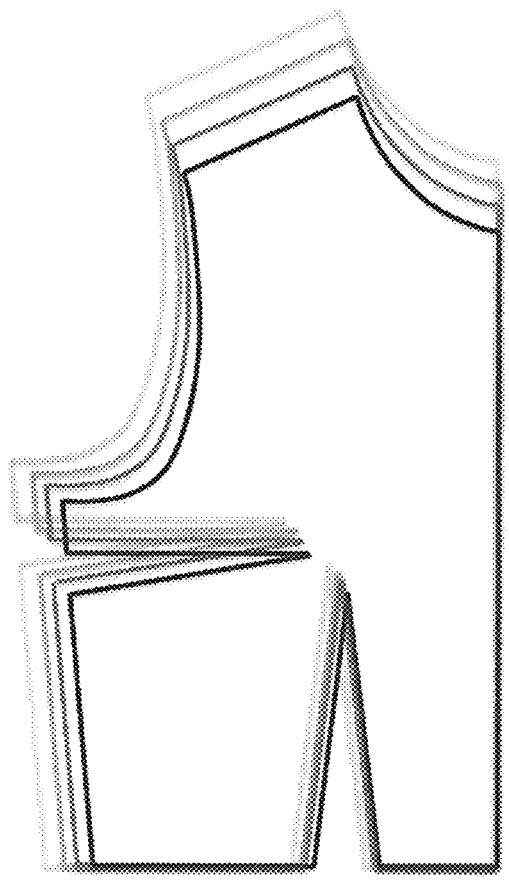
FIG. 1 is a diagram showing a linear grading of bodice panel.
Figure 2:
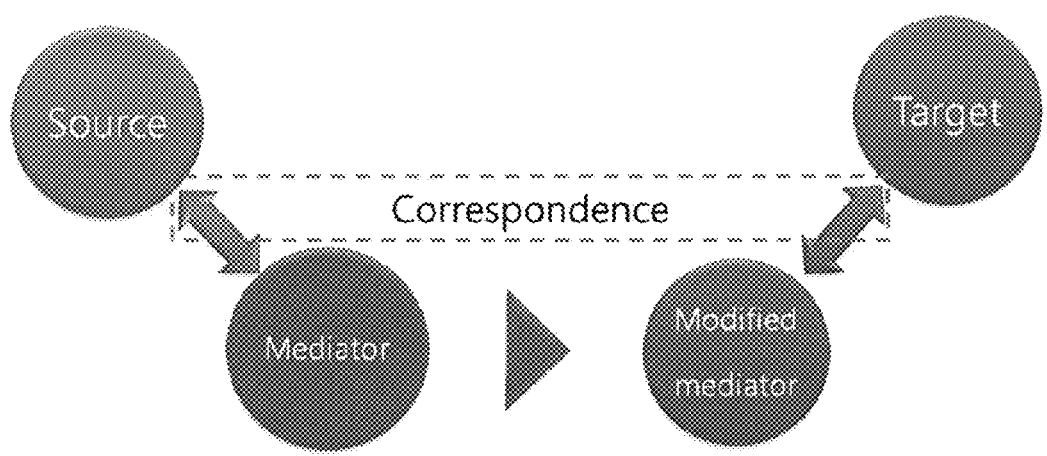
FIG. 2 is a diagram showing a framework of retargeting method according to the invention.

The Provisional U.S. Patent Application Ser. No. 61/767,711 and all the reference papers are incorporated by reference into this disclosure as if fully set forth herein.

We present fast and automatic method for garment grading. In the apparel industry, garment is designed to fit standard body, and then it is modified to fit specific body. This modification is called grading. Grading is very specialized and complex work. Therefore, it is extremely time consuming to do grading, also grading is a hard task without an exclusive knowledge. Nowadays, there are in need of the grading techniques in the animation and game productions, since costume design takes an important component in the process. Moreover, the variation of the bodies appearing is broader than the real clothing production, sometime such bodies are difficult to cover with the conventional grading methods. To solve above problems, we introduced retargeting technique which is widely used in the computer graphics field. To use retargeting technique, we need the mediator and the correspondence function. For the mediator of our method, we got the insight from the process of drawing the pattern-making draft. We call this mediator Parameterized draft. Local coordinates systems are good methods for making correspondence. Among others, the mean value coordinates system (MVC) would be an excellent choice, but needs to be improved so that the weights would have positive values. We improved the MVC and call it the omitted mean value coordinates (OMVC). To put it pithily, the mediator is parameterized draft, and correspondence function is the OMVC in our approach. We call this approach smart grading. Smart grading is less time-consuming and easy to implement. Therefore, our approach can minimize designer's specialized know-how and save performing time for the grading of real garment and virtual garment.

Chapter 1 Introduction

In the clothing production, a garment is usually designed for the standard body, and then the result is modified to fit specific body. The latter part referred to as grading. Since each individual's body can be different from the standard body which used in the original garment design, the design cannot be appreciated by other bodies without grading. Therefore grading is very important in the clothing field.

Animation and game productions are also in need of the grading technique, since costume design is an important component in the process. In fact, the variation of the bodies appearing in the animations or game is broader than the clothing production; clothes often need to be worn by monsters or animals as well as men of extreme proportions. Such bodies are difficult to cover with the conventional grading methods. Therefore, a new modeling technique, which transforms a given design to fit a particular body size, needs to be developed.

Although 'design' is a comprehensive concept, in this work where the main focus is grading, we will use the term 'design' to refer to a narrower concept: a set of panels comprising a garment. A panel is a piece of garment which is cut according to the pattern. Speaking in terms of data, a panel is represented by the contour geometry and interior points/lines. Therefore, focusing on a particular panel, a grading algorithm has to generate new contour geometry and interior points/lines which are supposedly fit to the specific body.

There exist many computer software for grading, but these grading is a tedious process which calls for a large amount of user's intervention. The two grading methods, namely, the put-and-spread method method and the pattern shifting are in use in the current clothing industry. When an original panel is given, those methods generates graded panels by applying translations to a set of panel vertices according to predetermined directions, as shown in FIG. 1. We will call this sort of grading as linear grading, since the translations are made along a straight line. Unfortunately, the linear grading may sometimes produce unsatisfactory results. Such linear expansion may not be an optimal treatment to accommodate the non-linearity in the body shapes. The above problem has been noted from long time ago. In luxury brands, therefore, a grading expert precisely makes further adjustments on top of the linearly graded results. But, it is time consuming and knowledge-intensive work.

In order to approach the problem from a different angle, grading is treated as retargeting problem. Retargeting method is done by correspondence between object and mediator

TABLE 1.1

The primary sizes of bodice as shown in 1.2.

| PBS (unit: cm) | source |
|---|---|
| Bust Circumference | 85 |
| Waist Circumference | 65 |
| Hip Circumference | 90 |
| Waist Back Length | 39 |
| Bust Point to Bust point | 17 |
| Neck Point to Breast Point | 24 |

First, we define correspondence between the source object and the mediator. Next, we modify the mediator. Finally, we make the target object according to the modified mediator while preserving the correspondence. Many researcher [29], [4], [20] introduced retargeting scheme for handling garment grading. In the previous works, 2D garment patterns are retargeted on 3D space, because the mediator is 3D body mesh. The result of these works is 3D garment mesh. But, only 2D panels can be used in the clothing production, therefore there need additional process such as pattern extraction. We present novel approach which switches from garment grading to 2D polygon retargeting problem. We call the approach smart grading, and call the retargeting step draft-space encoding and decoding. In order to do grading on 2D, we need a 2D mediator, which would be served as body on 3D space.

Figure 3:
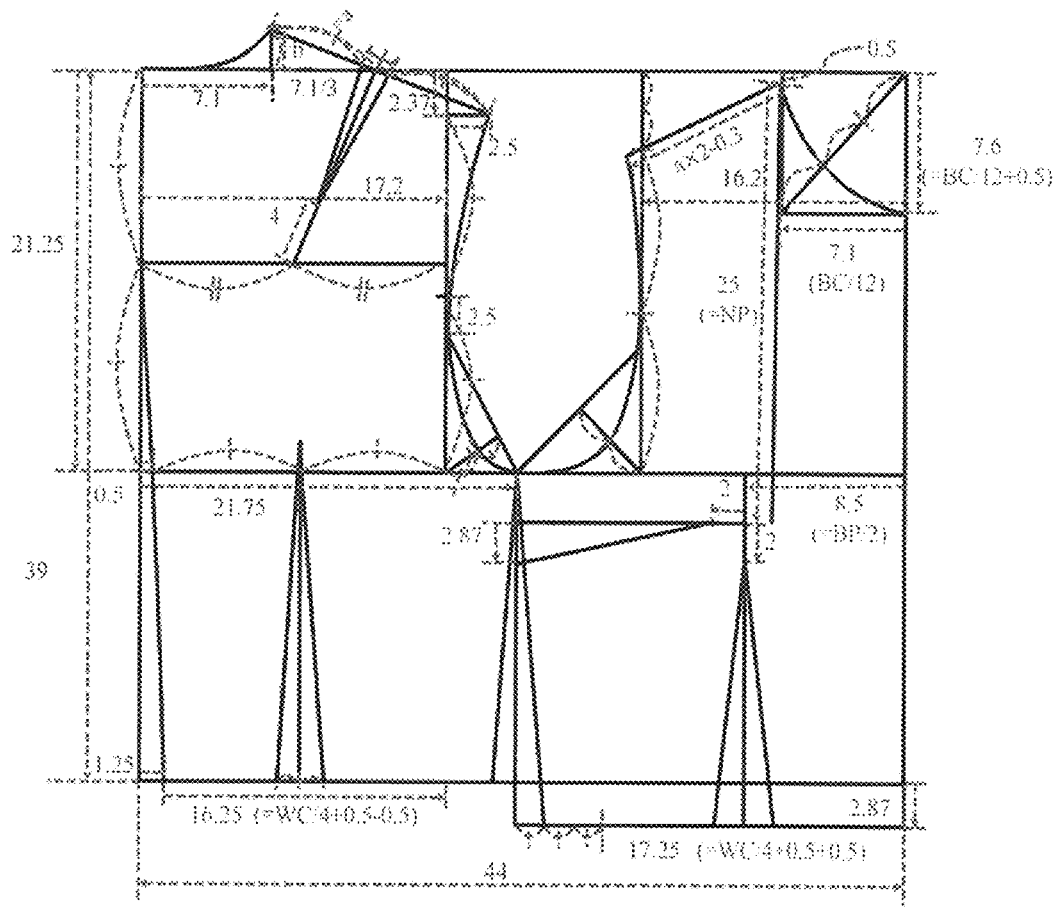
FIG. 3 is a bodice draft.
Figure 4:
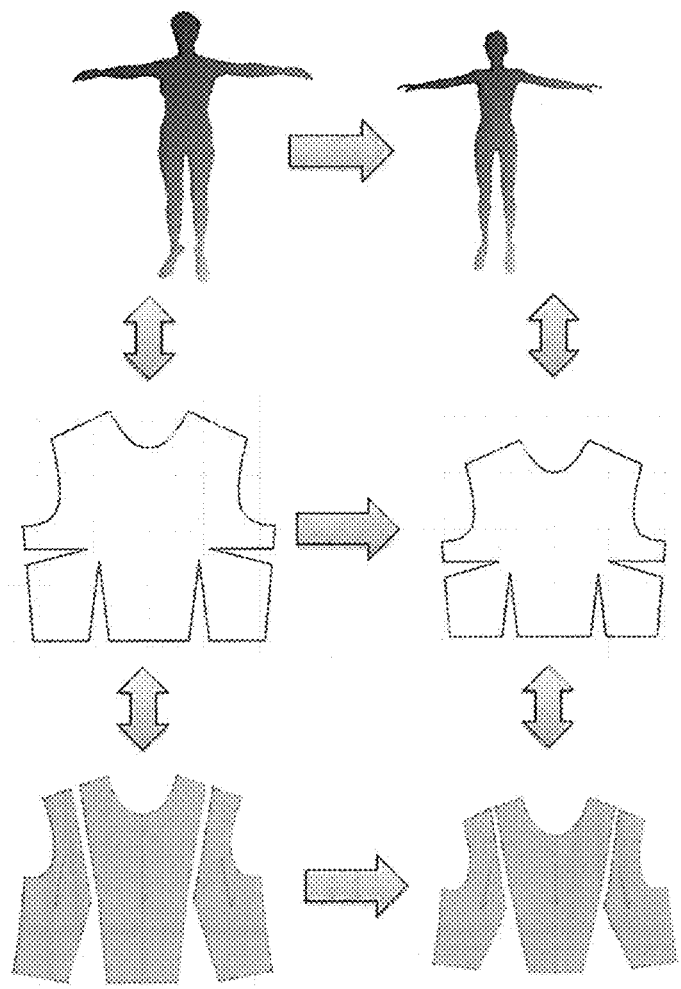
FIG. 4 is a diagram showing a problem description according to the invention.

For the mediator of smart grading, we got the insight from the process of drawing the pattern-making draft, an example of which is shown in FIG. 3. From the given primary body sizes (PBSs), a clothing expert can construct the draft by drawing points or straight/curved lines step by step. For example, FIG. 3 is drawn from six sizes listed in Table 1.1: the bust, the waist, the hip circumference, the waist back length, the bust point to bust point, and the neck point to breast point. We note that the draft gives one of the possible solutions which perfectly meet the given primary sizes requirement and supposedly meet other (non-primary) sizes satisfactorily. Since the draft is completely determined from the primary body sizes, we can abstract the construction process as a procedure D(*) which takes an arbitrary body then generates the draft for it. We call such abstracted draft, a procedure in a computer programming sense, as the parameterized draft. The result shown in FIG. 3 is D(A), the draft for a particular body A, whose parameters are given in Table 1.1.

Although construction of the parameterized draft cannot be considered as a garment design, it can serve as a mediator which relates a garment design to the body, which forms the main idea of this work. If a parameterized draft is available, we can decompose the original problem of grading to the following five steps. The first step is the Source Draft Construction. In this step, we create the draft D(A) by giving the PBSs of the source body. The second step is the Panel Positioning. We position the panels of the design, which is constructed for the body A, on the draft D(A). The third step is the Draft-space Encoding. We express each vertex ($v_i$) of the panel as a weighted sum of the vertices constituting the draft D(A). Finding the weights can be viewed as encoding the panel point in the form of coordinates in the D(A)-space. That is how this step is called the 'draft-space encoding'. The next step is the Target Draft Construction. By supplying the PBSs of the target body B, the parameterized draft generates the draft D(B) for it. The final step is the Draft-space Decoding. In this step, we decode the correspondence, which created in the Draft-space Encoding step, with respect to D(B) which will produce the graded version of the original design. This step corresponds to warping panels based on D(A)-to-D(B) discrepancy.

The quality of the draft-space encoding, which finds out the local coordinates of a panel vertex with respect to the draft, is essential for the proposed method to successfully work. There are several choices which can be employed for the draft-space encoding, including barycentric coordinates and mean value coordinates. We find that the mean value coordinates is an excellent choice, but needs to be improved so that the weights have positive values. We call the improvement we made in this paper to the existing mean value coordinates as the omitted mean value coordinates (OMVC).

Contributions We summarize the technical contribution of this paper as the following two: (1) the development of a new grading framework based on the parameterized draft, and (2) the development of OMVC Terminology We present a new grading framework in the clothing and computer graphics field. There are many terminologies of clothing fields in this paper. Now we introduce these terminologies and new notions.

Pattern: Which is an original garment. It is composed of lines and points. FIG. 3 shows simple bodice pattern.

Panel: A piece of cloth which is cut congruent to the pattern.

Grading: The process which linearly expands or reduces the original pattern is designed to fit typical body size as shown in FIG. 1.

Primary body sizes (PBS): Which is set of each region size to create parameterized draft.

parameterized draft: The pattern is drafted according to PBSs.

Panel point (vertex): The point (vertex) of panel.

Draft point (vertex): The point (vertex) of parameterized draft.

Chapter 2 Previous Work

We review the previous work in the garment grading algorithms and the draft-space encoding methods.

2.1 Algorithms for Garment Grading

In the clothing field, computer cad system [28] which have been used for garment design and grading in order to dispose tedious process. In the computer graphics field, researches on the grading of digital clothing are still in the early stage. Volino et al. [18] presented an interactive garment modeling system for clothing industry in which the garment could be edited on 3D, then its constituent 2D patterns can be created. Umetani et al. [16] presented a method in which the 3D garment and its constituent 2D patterns are coupled such a way that an interactive modification of one results in immediate and automatic modification of the other. When viewed from the clothing industry, both methods are revolutionary, since they allow fitting to a specific body in 3D and produces the 2D patterns of the fitted garment. However, we do not categorize them as grading techniques, since the methods are not for retargeting an original design to accommodate variations in the body.

Wang et al. [5] provided a garment modeling scheme, called the automatic made-tomeasure (AMM), which generates a garment that fits to a given arbitrary body. Wang et al.

[4] proposed a novel retargeting method which created spatial relationship between the target body and the source body.

The original garment is retargeted to the target body following the source-to-target spacial relationship established above. This method produces fine results in the aspect of fitting body. However, since the garment generation algorithm is closely couple with the body shape, the result can have distortions when a loose garment is retargeted. Meng et al. [29] presented an automatic resizing method which solves the distortion problem of [4] by introducing a local geometry encoding method for preserving the shape of garment. Recently, Brouet et al. [2] presented another method which can do retargeting a given garment, which is constructed for a source body, to a target body while preserving the original design. These methods have to go through the pattern extraction process [3], because the retargeted outputs are a 3D meshes.

2.2 Methods for Draft-Space Encoding

The essence of the draft-space encoding is expressing the position of each panel vertex with respect to the draft as a weighted sum of the draft vertices. In this work, an underlying assumption is that, when grading a design, the weights should be preserved.

The simplest approach is triangular barycentric coordinates system(TBC) which encodes a position within a triangle in terms of the weighted sum of the three vertices. TBC has many desirable features including non-negativity, linear interpolation, smoothness. Furthermore it is easy to implement. Many researchers have used TBC and some attempted extension of it to fit for their own purposes. Hoppe et al. [8] developed a method which uses TBC to create correspondence between high and low resolution faces for mesh optimization. Warren developed TBC which can take arbitrary convex polygons [9] and arbitrary convex sets [10]. Meyer et al. [15] presented another generalization of TBC which can apply to irregular, convex n-sided polygons.

Derose et al. [23] presented a new form of dimensional coordinates. It is called the harmonic coordinates (HC), because it is produced as a solution of the Laplace equation. HC has attractive properties including interior locality and non-negativity. Therefore, it is good solution to make appropriate correspondence between the cage[1] and interior vertex of meshes. Joshi et al. [17] introduced HC to solve the problem of creating and controlling the volume deformation of character articulation. Jacobson et al. [2] introduced a blendingbased deformation technique, called the bounded biharmonic weights(BBW), in which the weights of the vertices are blended to minimize the Laplacian energy. BBW can support not only cages but also points and bones. BBW can be good encoding method for handling exterior vertex.

Floater [14] introduced a new coordinate system, called the mean value coordinates (MVC), which was derived from the mean value theorem for harmonic functions. MVC is smooth and easy to implement. Ju et al. [25] improved the applicability of MVC from closed 2D polygons to closed triangular meshes. Hormann et al. [11] demonstrated that MVC is well defined for arbitrary planar polygons. Langer et al. [24] improved MVC to be able to take 3D polyhedra. MVC was used many applications which are based on retargeting problem. But, some weights of MVC can be negative, and it cause undesired result since negative wright involve counter intuitive, albeit rare. Lipman et al. [27] introduced the positive mean value coordinates (PMVC) which guarantees to have positive weights everywhere including the interior or exterior of the cage, unlike MVC. The key idea of PMVC originates from HC, therefore PMVC shows similar results with those of HC. GPU-based PMVC is developed by [23], which has been shown faster than HC. Therefore PMVC can be one of good candidates for a draft-space encoding technique.

Chapter 3 A New Framework for Grading Based on The Parameterized Draft

This chapter gives a more detailed description of the problem. Since the new grading framework is based on the (pattern) draft and its parameterized version, we also introduces the draft and the parameterized draft in detail, then summarizes the main contribution of this work.

3.1 Problem Description

A garment is composed of a number of panels $[p_1, p_2, \ldots p_N]$ which are stitched together at the sides. Each panel $p_i$ is a cloth piece, but in terms of data, a panel is represented by a collection of points and lines. Grading can be thought of as the following retargeting problem.

Given:

A garment design, i.e., a set of panels $P(A)=[p_1, p_2, \ldots, p_N]$ prepared for a specific body A.

A new body B (whose specifics are given with the PBSs).

Find:

A new version $P(B)=[p\hat{0}_1, p\hat{0}_2, \ldots, p\hat{0}_N]$ which supposedly comprises the same design, but fits to the new body B.

Figure 5:
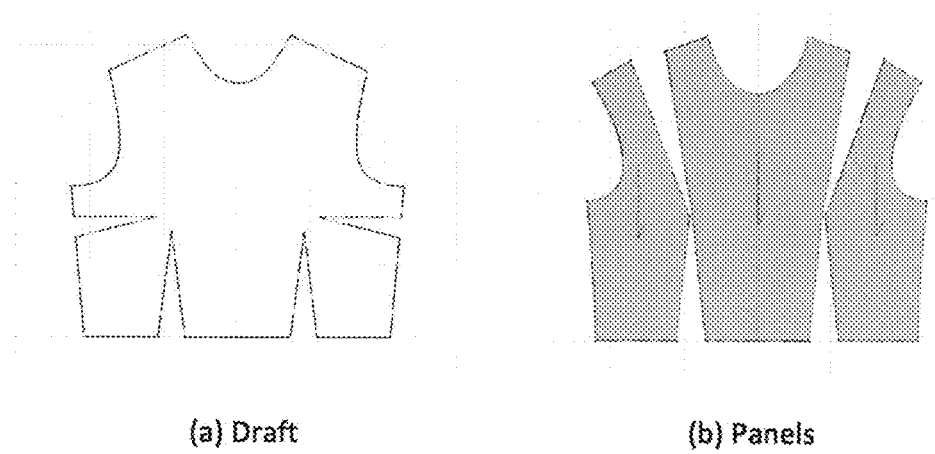
FIG. 5(a) is a diagram for a draft and FIG. 5(b) is a diagram for panels.

Draft and parameterized Draft Pattern-making is the science to find out the panels which constitutes a given design. But another important requirement imposed for the pattern-making is that the result garment should fit to the body. To answer for the fitting part, fashion field has been using the drafting from a long time ago. FIG. 5a shows a draft for the basic bodice (the front part) and FIG. 5b shows a panel derived from that draft. Although in the details of each panel is varied from draft for design purpose, the primary body sizes such as the waist girth are kept the same.

Figure 6:
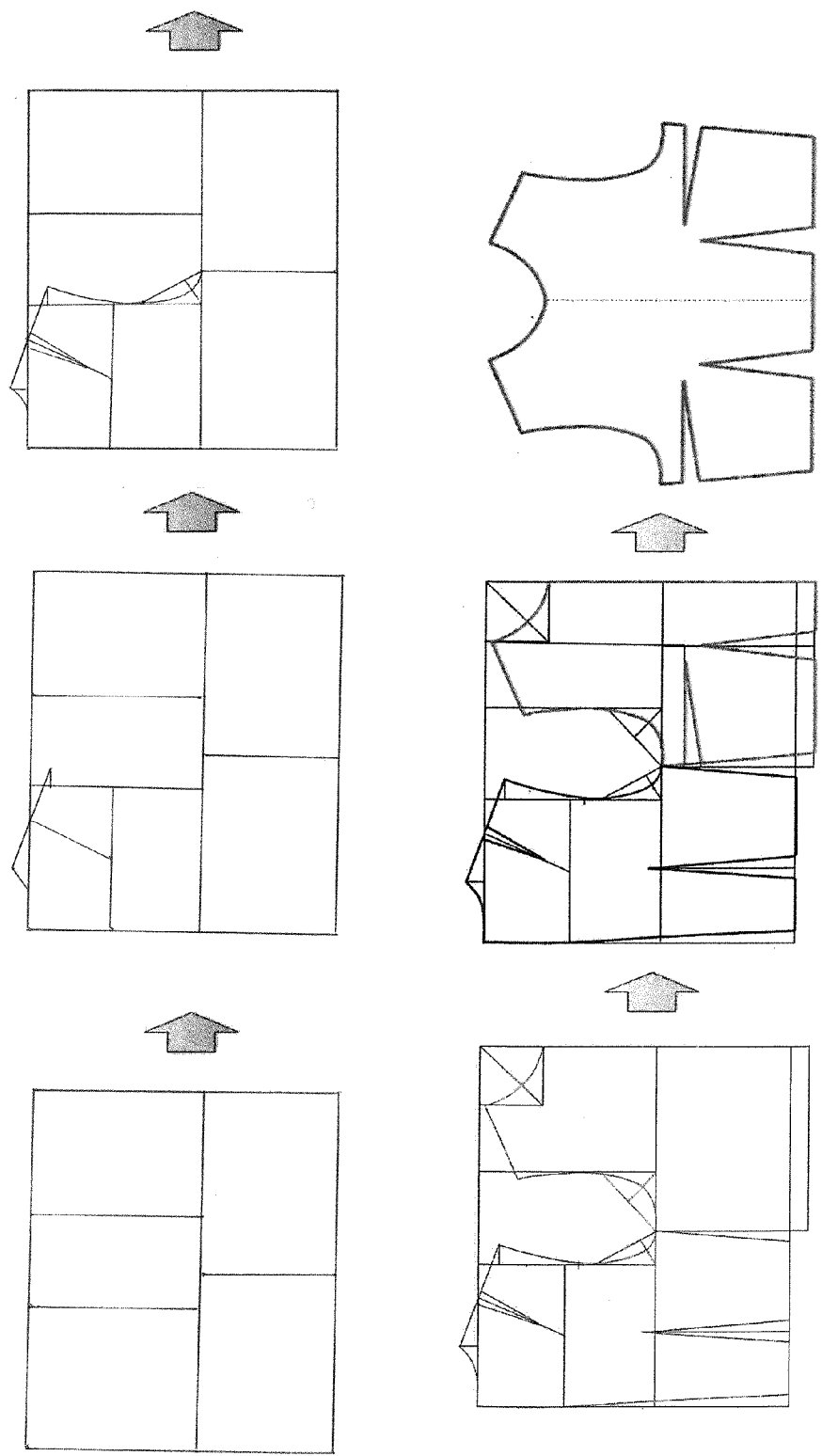
FIG. 6 is a diagram showing intermediate steps for creating drape.

In fact, drafting is a common element practiced from fashion departments. SADI, SMOD and DCC has established their own ways of drafting the basic bodice, skirt, sleeve, pants, etc. FIG. 6 shows a few intermediate steps until the final draft is drawn. In fact, drafting steps consist of the following types of operations which can be executed with no other input than the primary body sizes. For instance the bodice use 6 primary body sizes.

drawing parallel/perpendicular lines
drawing curved line according to control points
dividing a line into two or three pieces of equal length
finding intersection point
symmetrizing points or lines
extending and reducing lines If we decompose the drafting of FIG. 6 into the above operations, it takes 73 operations, taking tens of minutes even to an experienced pattern-maker. But here we note that those operations are very basic to implement. For the application of the basic bodice drafting, for example, we can write a C++ function which takes. We call it parameterized draft (PD), and call the application draft constructor.

3.2 Our Main Contribution

Particularly rewarding is that we introduce parameterized draft (PD) which make it possible to do grading (retargeting problem) on 2D. For solving retargeting problem, we need mediator. For example, a 3D body mesh is the mediator in 3D based grading. On the other hand, our method is based on 2D, we need a mediator to replace 3D body mesh. we can say that PD is the appropriate mediator for our method. Because, the two facts, (1) PD can draw the draft for arbitrary body and (2) PD can be drawn instantly, led us to the new grading framework.

In the previous works [29], [4], [20], 2D garment patterns are retargeted on 3D space, therefore we need interlocking steps, which make compatibility between 2D and 3D, such as physics based simulation, pattern extraction. Interlocking steps may create some numerical errors while we solve the linear system, but also these processes involve a lot of computational cost and memory. We simplified grading procedure to remove interlocking step. Consequently, smart grading lead to time and memory saving for garment grading. To our knowledge, there has not been a grading method which is based on the parameterized drafting. Therefore, the novel idea of utilizing parameterized draft for the purpose of grading forms the main contribution of this work in the field of garment grading.

3.3 Judging the Quality of Garment Grading

Fitting The aim of garment grading is modifying the garment to fit the target body. In the other garment grading methods [4], [20], [29], measuring how much fitting is directly calculated by the distance between each vertex of garment mesh and each vertex of body mesh, therefore reducing the distance is important point of these grading method. In our method, we can generate parameterized draft which always fit to the target body. Therefore each panel of garment would be graded in order to fit the target body, if encoding and decoding are processed according to proper coordinates system.

Shape Preserving shape is another crucial property of garment grading, therefore fitted garment should be accorded with original garment design. But original garment design may be broken, since we try to fit the target body. The localization is necessary to preserve design, because the position of panel vertex must not be changed by modifying position of irrelevant draft vertex. We improved mean value coordinates system [14], which to strengthen locality, and then we found appropriate scheme which is called omitted mean value coordinates. According to our new scheme, each draft vertex has properly localized weights. Therefore our noble framework is a good method for maintaining garment shape.

Chapter 4 Overview

Figure 7:
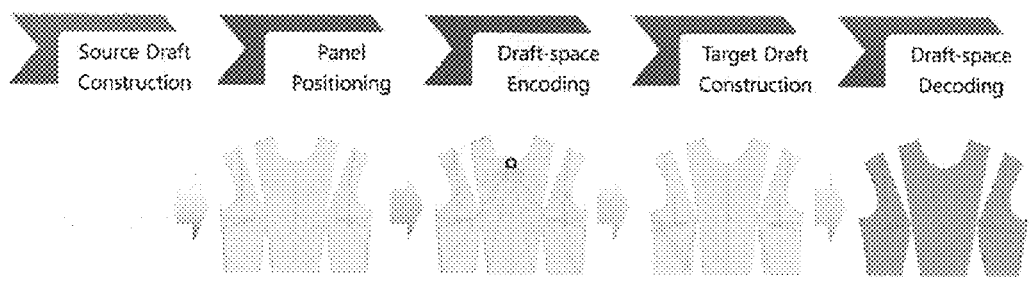
FIG. 7 is a diagram showing a framework of smart grading according to the invention.

We present framework of smart grading which is composed to 5 sub-steps as shown in FIG. 7. Inputs of this process are source panels (light gray) which are designed by professional designer to fit source body (standard body), outputs are graded panels (dark gray) which suppose to fit target body (specific body). As discussed 3.1, we can easily generate parameterized draft by using draft constructor. Encoding and decoding steps are represented by linear combination. For these reasons, performing smart grading can be simple, fast and automatic.

Source Draft Construction In this step, we construct source drafts (D(A)) as shown in first figure of FIG. 7. The shape of D(A) is decided from the PBS of the source body (A), garment types (bodice, skirt, pants, sleeves, etc.) and gender. We just determine garment type, gender and PBS. Drawing draft can be automatically done by using draft constructor, we do not have to any calculation.

Panel Positioning In this step, we arrange the source panels on the draft. A panel is a piece of cloth, and the draft is basic sketch for designing garment panels. The position is very important, because we make correspondence between position of each panel vertex and position of draft vertex in the next step. Therefore this step requires meticulous attention. We assume that garment panels are made based on the parameterized drafts, thus panel positioning would be a trivial problem as shown in second figure of FIG. 7.

Draft-space Encoding We make correspondence between source draft vertices ($v_i$) and each panel vertex ($P_j$). $P_j$ is represented by linear combination of draft vertices. We define a set of weight function $\lambda_i$ by using OMVC. More details are presented in Chapter 5

$$P_j = \Sigma_{i=1}^{k} \lambda_i v_i, i \in D(A) \qquad (4.1)$$

Target Draft Construction In this step, we generate target draft D(B) by using draft constructor, which is depicted by the blue lines in forth figure of FIG. 7, according to PBS of target body (B). Target draft is designed to fit the target body, so the position of vertex ($\hat{v}_i$) is different with position of source draft vertex.

Draft-space Decoding In this step, we transfer garment panel vertices ($P_j$) to fit the D(B). Each graded panel vertex ($\hat{P}_j$) are transfered through linear combination of $\hat{v}_i$. We use same weights ($\lambda_i$) which were already calculated draft-space encoding step. The last figure in FIG. 7 shows graded panels (dark gray). It is the output of our framework.

$$\tilde{P}_j = \Sigma_{i=1}^{k} \lambda_i \hat{v}_i \qquad (4.2)$$

Chapter 5 Draft-space Encoding and Decoding

In this chapter, we present a new draft-space encoding and decoding method which can be used for the proposed grading framework. As illustrated in FIG. 7, a panel vertex is encoded as a linear combination of the draft vertices, and the basic assumption is that the weights are kept the same for the target garment. The rationale behind that assumption is that the draft for the target body already contains all the necessary scaling.

Under the above assumption, the result of grading will depend on (1) the method used for the draft-space encoding, and (2) the implementation of the parameterized draft. Since the parameterized draft is a simple adoption of clothing expertise, the only engineering part whose quality will affect the grading quality the draft-space encoding and decoding. This chapter focuses of the draft space encoding and decoding. It starts with the previously proposed candidates for the draft-space encoding, then presents a new encoding method which is experimentally proven optimal so far for the grading task.

5.1 Previous Encoding Methods

In this section, we briefly review the previous methods which encode a 2D position in terms of the neighboring vertices of the cage.

5.1.1 Triangular Barycentric Coordinates

Figure 8:
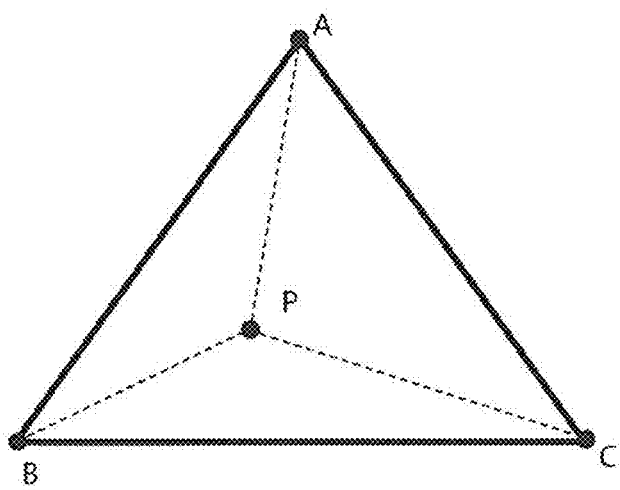
FIG. 8 is a diagram showing a triangular barycentric coordinates.

The triangular barycentric coordinates (TBC) is one of the most popular methods which have been used for encoding a position within a triangle. In the TBC, referring to FIG. 8, a position P is represented as a linear combination of the triangle vertices A, B, and C $$P = \alpha A + \beta B + \gamma C, \qquad (5.1)$$

with $$\alpha + \beta + \gamma = 1 \qquad (5.2)$$

where $\alpha$, $\beta$, and $\gamma$ are the weights of the linear combination. Those weights are in fact proportional to the areas of the triangles PBC, PCA, and PAB, respectively. Note that for the position exterior to the triangle, the weights can take negative values.

Barycentric coordinates is easy to implement and takes a low computational cost. But the draft-space encoding has to handle the situation shown in FIG. 9 in which the position we want to represent is enclosed by a n-polygon which not a triangle. It can have more than three vertices. Moreover, the polygon does not need to be convex. If we are to use the barycentric coordinates in this situation, (1) first we have to triangulate the draft, then (2) record the triangle that encloses the encoded position as well as the barycentric coordinates with that triangle.

Generally, we can use it on the triangle, so using barycentric coordinates system accompanied some distortion without proper triangularization. However triangularization brings another computational cost and accumulation error. Therefore, we have to take other coordinate system can be applied to wider polygons.

5.1.2 Mean Value Coordinates

Several approaches have been proposed which can directly encode a position with respect to a general polygon without going through the triangulation [11], [9], [14], [22], [7], [21].

Figure 9:
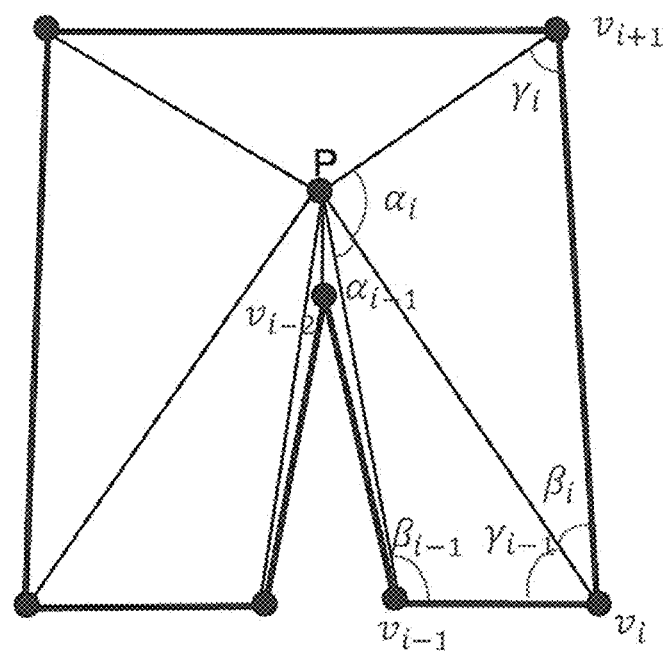
FIG. 9 is a diagram showing mean value coordinates.

Suppose that $v_1, \ldots, v_N$ are vertices on the plane (in the counter-clockwise order), and we want to encode a position P on that plane as a linear combination of those vertices (FIG. 9)

$$P_j = \Sigma_{i=1}^{N} \lambda_i v_i \qquad (5.3)$$

with $$\Sigma_{i=1}^{N} \lambda_i = 1 \qquad (5.4)$$

The methods determine the weight $\lambda_i$ for the vertex $v_i$ by referring to the areas of the triangles. For example, Wachspress [7] determines $\lambda_i$ according to $$\lambda_i = \frac{w_i}{\sum_{k=1}^{N} w_k}, \qquad (5.5)$$

where $$w_i = \frac{A(v_{i-1}, v_i, v_{i+1})}{A(v_{i-1}, v_i, P) A(v_i, v_{i+1}, P)} = \frac{\cot \gamma_{i-1} + \cot \beta_i}{\|v_i - P\|^2} \qquad (5.6)$$

The weighting scheme satisfies the basic requirement of the encoding; When P is close to the vertex $v_i$, $\lambda_i$ is close to one; If P happens to be on $v_i$ itself, $\lambda_i = 1$. However, when the polygon is concave as shown in FIG. 9, $\lambda_i$ can have a negative value. Eck et al. [13] and Pinkalla et al. [26] proposed other schemes for determining the weights, but did not guarantee all the weights are positive. Negative weights lead to counterintuitive encoding which causes distortion [27].

Floter [14] introduced another weighting scheme, so-called the mean value coordinates (MVC).

$$\lambda_i = \frac{w_i}{\sum_{k=1}^{N} w_k}, \quad w_i = \frac{\tan(\alpha_{i-1}/2) + \cos(\alpha_i/2)}{\|v_i - P\|^2} \qquad (5.7)$$

The method is named that way because the weights are determined by applying the mean value theorem to the harmonic functions. Since both $a_i/2$ and $a_i-_1/2$ are less than 90 degrees, the weight $w_i$ is positive. In addition to giving the positive weights, the encoding quality of MVC is superior to other methods as reported in [25], [11], [24].

5.2 Amendment to Omitted Mean Value Coordinates

Figure 10:
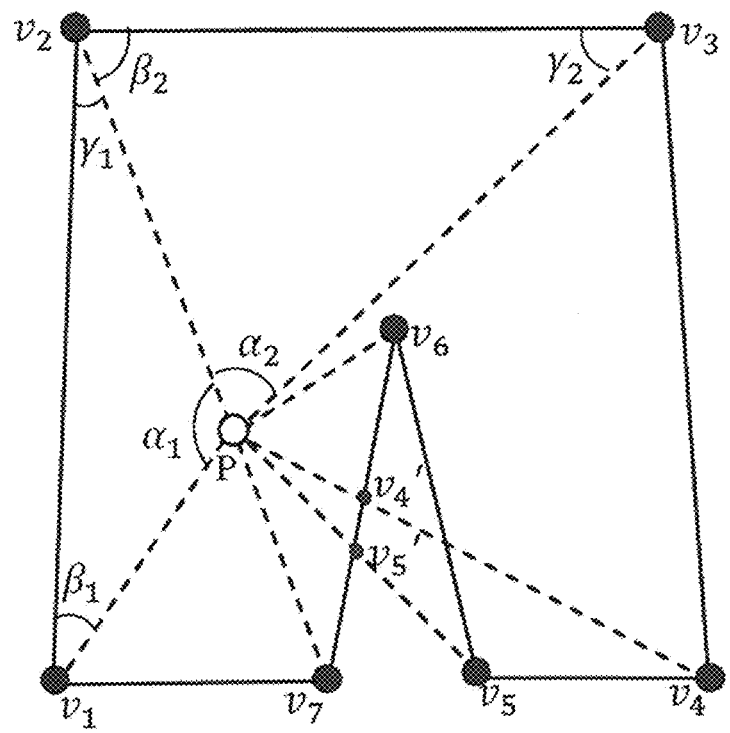
FIG. 10 is a diagram showing an omitted mean value coordinates.

Unfortunately, when encoding P in the situation shown in FIG. 10, the weights of $v_2$ and $v_3$ calculated using MVC turns out negative. It is because the counter-clockwise indexing of MVC interprets the situation anomalously. The positive mean value coordinates (PMVC) [27] has been proposed to address the above problem of MVC. PMVC determines the weights for P referring to $v^0_2$ and $v^0_3$ instead of $v_2$ and $v_3$ (in addition to the remaining vertices).

Although PMVC encodes an arbitrary position within a concave polygons with nonnegative weights, however we did not use this method for the draft-space encoding. Instead we used a different variation of MVC. We named the method the Omitted mean value coordinates (OMVC), because it uses only visible draft vertices for calculating the weights. For example, in the case shown in FIG. 10, the methods exclude $v_2$ and $v_3$ in determining weights for P. The rationale behind this decision was that invisible vertices are out of the locality for P thus should not influence P. More specifically, $$P = \Sigma_{i=1}^{N} \lambda_i v_i, \qquad (5.8)$$

where $\lambda_i = 0$ if $v_i$ is invisible from P. For visible vertices, $\lambda_i$ is calculated according to Equation 5.7. Of course, in this calculation, the invisible vertices do not participate. For example, for the case shown in FIG. 10, the weights are calculated referring to $(v_1, v_4, v_5, v_6, v_7)$ in that order.

5.3 Handling Outliers

In the previous sections, we presented methods to encode vertices interior to the given polygon. Even for a concave polygon, both PMVC and OMVC generates positive weights for interior and boundary points. Unfortunately, for both methods, handling exterior points is difficult. First of all, an exterior point may not be expressed as a linear combination of the draft vertices. In this section, we extend the OMVC so that the new method can give meaningful weights even when the panel vertices come exterior to the polygon.

Figure 11:
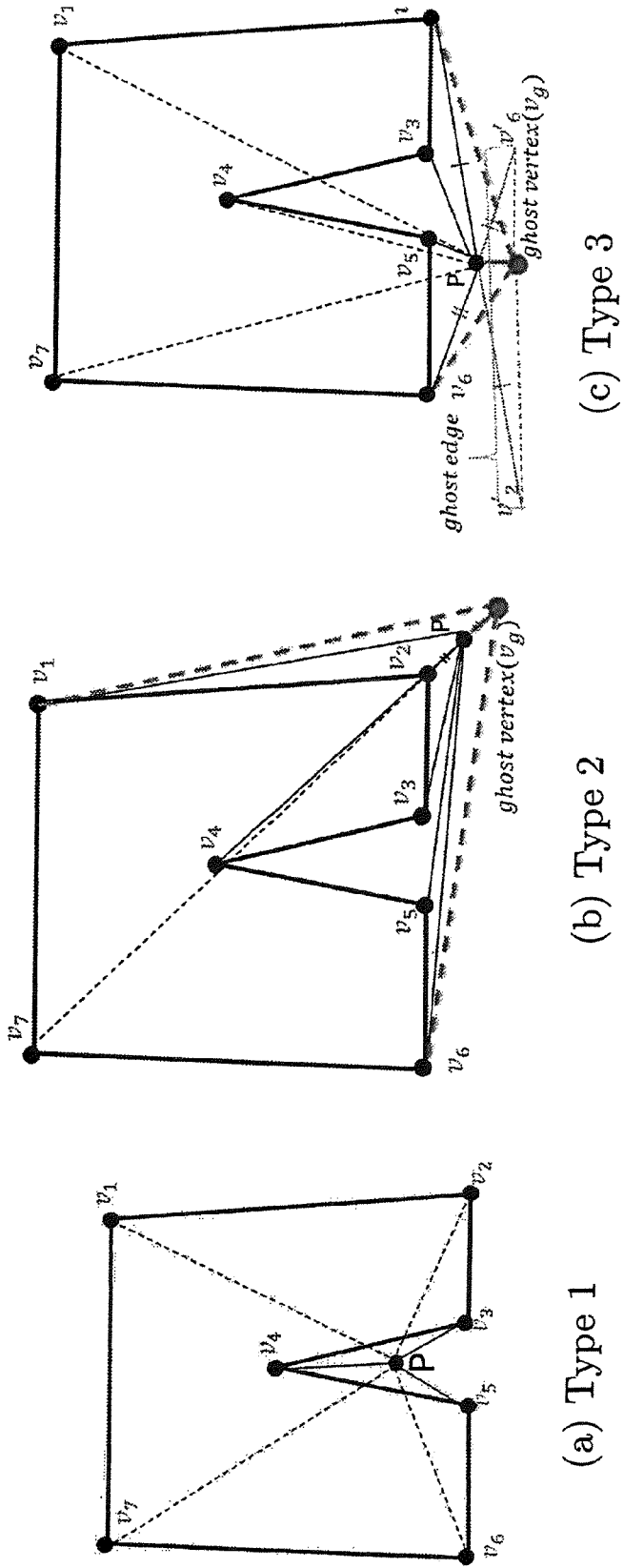
FIG. 11 is diagrams showing handling exterior vertices according to the invention.

As shown in FIG. 11, we classify exterior vertices into three types. Type 1 is the case when the point is located in the convex hull of the draft as shown in FIG. 11a. In the construction of a garment, Type 1 occurs when the panel vertex comes in the dart or armhole of the draft. Types 2 and 3 are the cases when the point comes outside the convex hull. When the exterior vertex is close to a draft vertex, we classify the case as Type 2. When the exterior vertex is close to an edge, we classify the case as Type 3. More specifically, for the given position P, we distinguish Types 2 and 3 by the spanning angle of P. The spanning angle is the maximum angle that can be constructed from P with the visible vertices of the draft. For example, in FIG. 11(b), at P, $v_1, v_2, v_3, v_5$ and $v_6$ are visible. (looking from exterior)

Among those choices, angle $(v_1, P, v_5)$ is the maximum, thus that is the spanning angle. Now, if the spanning angle is an acute/obtuse angle, we judge the exterior point as Type 2/3, respectively. Note that when the spanning angle is acute the point is close to corner and vice versa. In addition, the advantages of this method is that we already calculate the angle $(v_i-_1, P, v_i)$ when we calculated the weight. Therefore, we need not additional calculation and other data such as the area or the point of intersection.

For Type 1, we generate the weights for P using only the visible draft vertices according to the original OMVC presented in Section 5.2. (For the case shown in FIG. 11a, the visible draft vertices are $v_3, v_4, v_5$)

For Types 2 and 3, however, the original OMVC-based weights calculation does not work, since P cannot be expressed as a linear combination of the visible points. We introduce the ghost vertex to solve this problem. We first create a ghost vertex at a proper location. Then, we extend the draft by including the ghost vertex. Now P lies inside the extended draft, thus we can encode it with OMVC. In Type 2, we determine the ghost vertex at the position which is symmetric to the nearest vertex with respect to P. For example, for the case shown in FIG. 11b, $v_g$ is determined so that P becomes the mid-point between the ghost point $v_g$ and the nearest draft vertex $v_2$.

In Type 3, P is close to an edge, therefore edge data is counted more in calculating the weights. We define the spanning edge which is closely related to the spanning angle. The spanning angle is defined among three points: P and other two points $v_x$ and $v_y$. The spanning edge is the imaginary edge between $v_x$ and $v_y$. For the case shown in FIG. 11c (c), the spanning edge is ($v^2$, $v_6$). From the spanning edge, we construct another edge (called the ghost edge) which is point-symmetric to the spanning edge with respect to P. In FIG. 11c (c), the ghost edge ($v'_2$, $v'_6$) is represented by the red dotted line. Now, we define the ghost vertex at the inner-division vertex of the ghost edge, such that the ratio ($v'_2,v_g$):($v'_6$, $v_g$) is equal to ($v'_2$, P):($v'_6$,P). [2] The simplest approach is that we determine the midpoint of the ghost edge to the ghost vertex, but it can cause minor distortion. Since, closer vertex more affect P than another symmetry vertex according to geometrical meaning. Therefore, we set the ghost vertex by using inner-division. The result would be more accurate, because this method considers the importance of near draft vertex.

5.4 Comparison

In the following, we compare the quality of the weight calculation in different methods.

Figure 12:
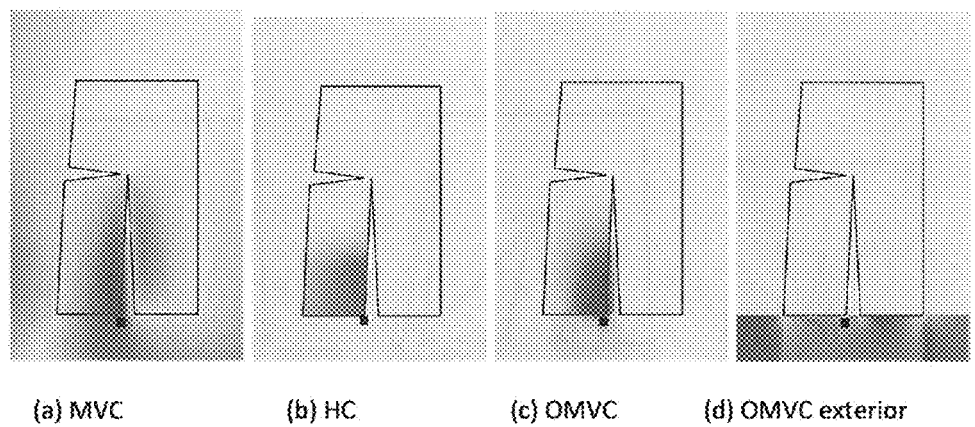
FIG. 12 is diagrams showing (a), (b), (c): weight of the vertex v in encoding an arbitrary point. (d): weight of the ghost vertex in encoding exterior points. Red/Gray/Blue indicates that v has a positive/zero/negative weight for that position, respectively.
Figure 13:
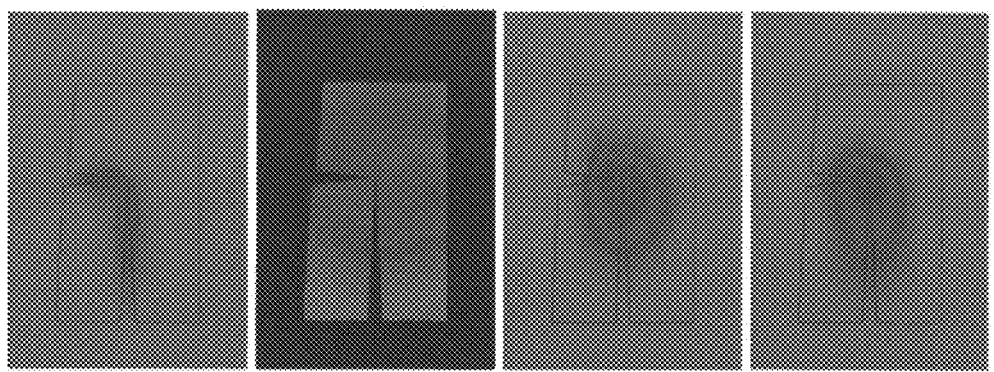
FIG. 13 is a diagram showing comparison of the color blending quality. Among ten draft vertices, only two at the center are blue and the other vertices are red. At an arbitrary point, encoding is performed with different methods. The result of encoding is visualized by the color.

Non-Negativity FIG. 13 shows negativity of each method. In the concave polygon, MVC can generate negative weights as shown in FIG. 12a. FIG. 12b shows HC generates non-negative weights for the interior region. FIG. 12c shows that OMVC generates nonnegative weights for both interior and exterior regions. FIG. 12d is showing the weights of the ghost vertex in encoding exterior points. Note that the position of the ghost vertex Sensitivity and Locality We observed sensitivity and locality through color blending experiment as shown in FIG. 13. FIG. 13a shows that MVC generate smooth result. However, MVC is too localized to use the garment grading, since each panel is graded according to draft shape, not specific vertex. Because, negative weights lead to counter-intuitive effect. We can produce less localized result according to HC, also HC produce smooth result as shown in FIG. 13b. However, it can not treat exterior vertex which is the black region in the FIG. 13b. The result of OMVC generally have to be non-smooth as shown in FIG. 13c. Since, we use visibility which is non-smooth property when we calculate weights. Fortunately, we can overcome this problem by using the sub-dividing scheme which keep the shape of original draft. FIG. 13d shows appropriate result which is smooth and less localized than the result of MVC.

Chapter 6 Results

We implemented the method presented in this paper on an Intel Core i7 CPU at 3.20 GHz and a NVIDIA Geforce GTX560 GPU. We constructed two outfits, a one-piece (FIG. 17) and a minidress (FIG. 23a), to test the method. The one-piece was used for quantitative analyses of the method, including the silhouette analysis, garment pressure analysis, and the air gap analysis. The minidress was use to demonstrate that the method can process complex garments. The quality of the proposed grading method should in principle be based on constructing real garments with real fabrics. However, because of difficult to analyze by using real garment, we used a physically-based simulator which is built based on [6] [19] [12] for the analyses.

Figure 14:
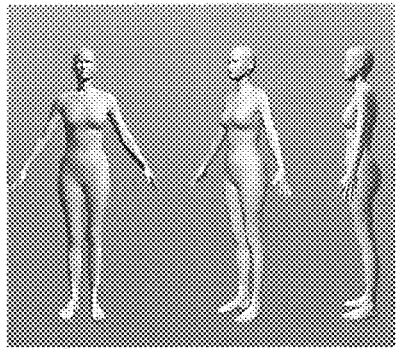
FIG. 14 is diagrams showing a source and target bodies.
Figure 14:
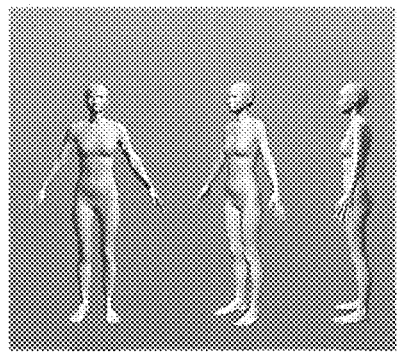
Figure 14:
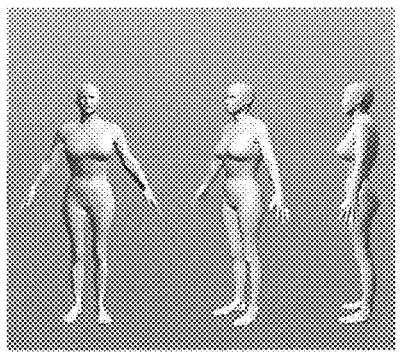
Figure 14:
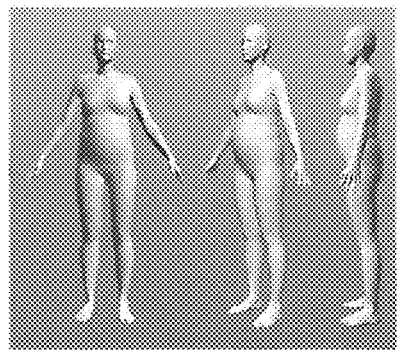

Both of the above dresses took under one millisecond for the whole of smart grading process including the generation of the source and target draft, encoding and decoding. Therefore we will not give any time analysis. FIG. 14a shows the source body and three target bodies used for the experiment. The PBSs of those bodies are summarized in Table 6.1.

Figure 15:
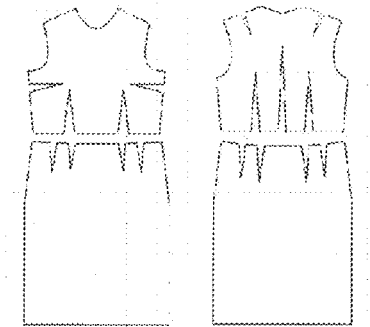
FIG. 15 is a diagram showing a draft set of source and target bodies.
Figure 15:
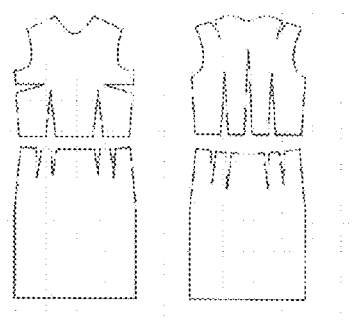
Figure 15:
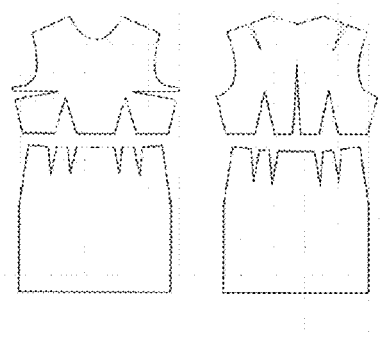
Figure 15:
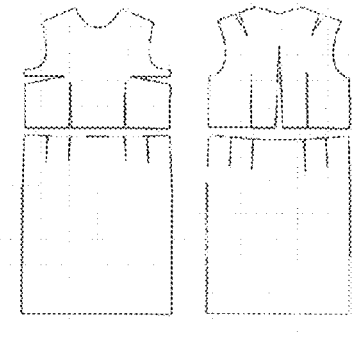

For our experiment, we made parameterized drafts by using PBSs. These drafts consist of four parts, which are front bodice, rear bodice, front skirt and rear skirt, as shown in FIG. 15. These drafts well reflect body's property. For example, if the body is small, the draft would be small likes FIG. 15b. Dart, which look like wedge, is related to shape of body. The darts are big about the curvy body (FIG. 15c). However the darts are small in the draft 3 (FIG. 15b), because target body 3 is smooth.

TABLE 6.1

The primary body sizes: PBSs of source and target bodies.

| PBS (unit: cm) | Source | Target 1 | Target 2 | Target 3 |
| --- | --- | --- | --- | --- |
| Bust Circumference | 85 | 75 | 100 | 95 |
| Waist Circumference | 65 | 57 | 60 | 95 |
| Hip Circumference | 90 | 76 | 90 | 98 |
| Waist Back Length | 39 | 37 | 37 | 43 |
| Bust Point to Bust point | 18 | 16 | 19 | 20 |
| Neck Point to Breast Point | 25 | 23 | 28 | 26 |
| Skirt Length | 55 | 48 | 48 | 60 |
| Hip Length | 19 | 18 | 18 | 21 |
| Height | 172 | 153 | 153 | 185 |

We need eight PBSs to generate parameterized draft of one-piece. Skirt length is the length between waist and knee.

6.1 Drafts Generation

FIG. 15 shows the drafts of the one-piece (the source and three target bodies), which were prepared by a supplying the PBSs of those bodies to the parameterized draft constructor. The design consists of four drafts: front bodice, rear bodice, front skirt, and rear skirt. As shown in the figure, the parameterized draft constructor creates the draft which reflects the body sizes. For example, the darts (Darts, which look like wedge, are folds sewn into planer garment panel to fit a body shape.) in the drafts for Target Body 3 is narrow, which agrees with the real situation where the and bust and waist girths are almost the same.

6.2 Grading of The One-piece

Figure 16:
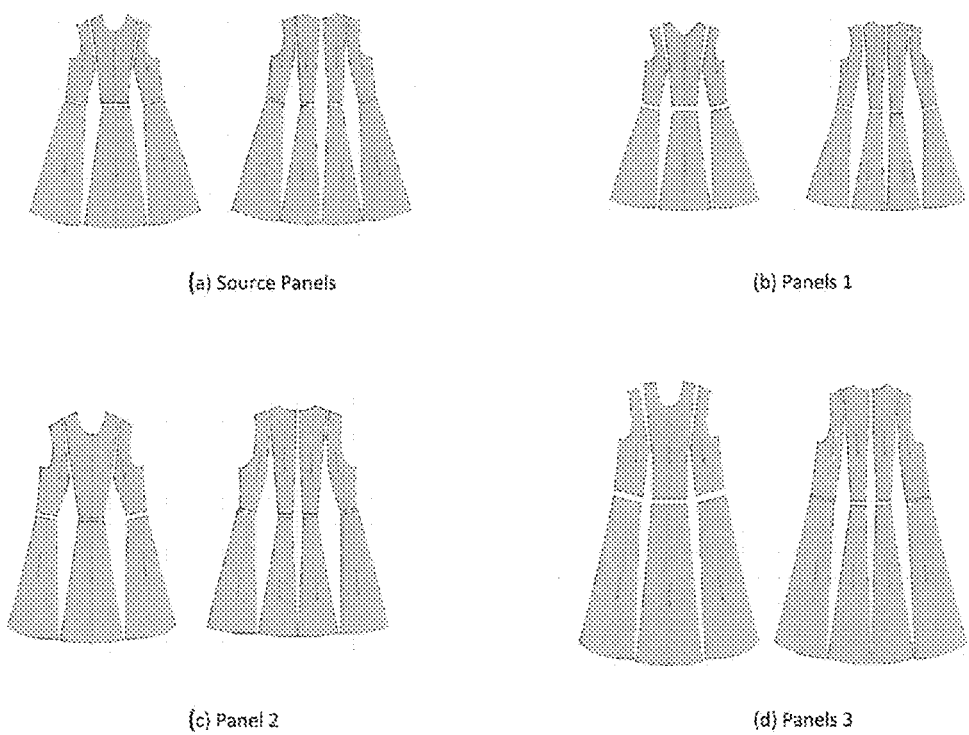
FIG. 16 is a diagram showing a source and graded panels: Source garment panels is composed of three panels of front bodice, four panels of rear bodice, three panels of front skirt and four panels of rear skirt. In the source garment panels, there are diamond-shaped spaces, which is significant property, for tightening a garment around waist and for making wrinkles on the skirt.

In the our method, the input was source garment panels which was designed to fit source body. FIG. 16a shows the source garment panels. For increasing accuracy of the source garment panels, we were helped by designer in the Digital Clothing Center. Therefore the source garment panels well fit to the source body. Source garment panels is composed of three panels of front bodice, four panels of rear bodice, three panels of front skirt and four panels of rear skirt. There were diamond-shaped spaces in the garment panels, they were equivalent to waist dart of the drafts.

FIG. 16b, FIG. 16c, FIG. 16d show the each result of smart grading. Every garment panel was graded according to the each draft and OMVC. In the Panels 1, each panel was short and narrow. The width of the diamond spaces was kept, since the width of darts did not changed in the draft. Similar to the Panels 1, the Panels 2 (FIG. 16c) also became short, but we observe that these panels were broader than source panels. Also diamond-shaped spaces were widened, since diamond-shaped spaces were closely related to the waist darts which had been widened in the Draft 2. In the Panels 3, each panel was big and diamondshaped spaces were narrowed. Every panel was modified for fitting each target body, but our method preserved the panels shape such as arm hole, diamond space and neckline.

6.3 Silhouette Analysis

Figure 17:
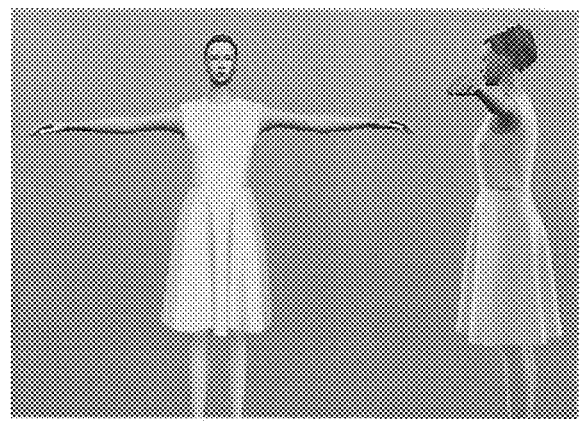
FIG. 17 is a diagram showing a garment silhouette.

For the silhouette analysis, we draped the source dress (FIG. 14a) to the source body (FIG. 16a), also we draped the graded dress (FIG. 16b, FIG. 16c, FIG. 16d) to each target body. After draping the garment, we observed silhouette of garment. The source dress well fitted to the source body as shown in FIG. 17, since professional designer made this dress according to PBS of source body. The dress was a properly tight around the waist and has side opening which are the characteristics of this dress. The skirt part was reached little above the knees.

Figure 18:
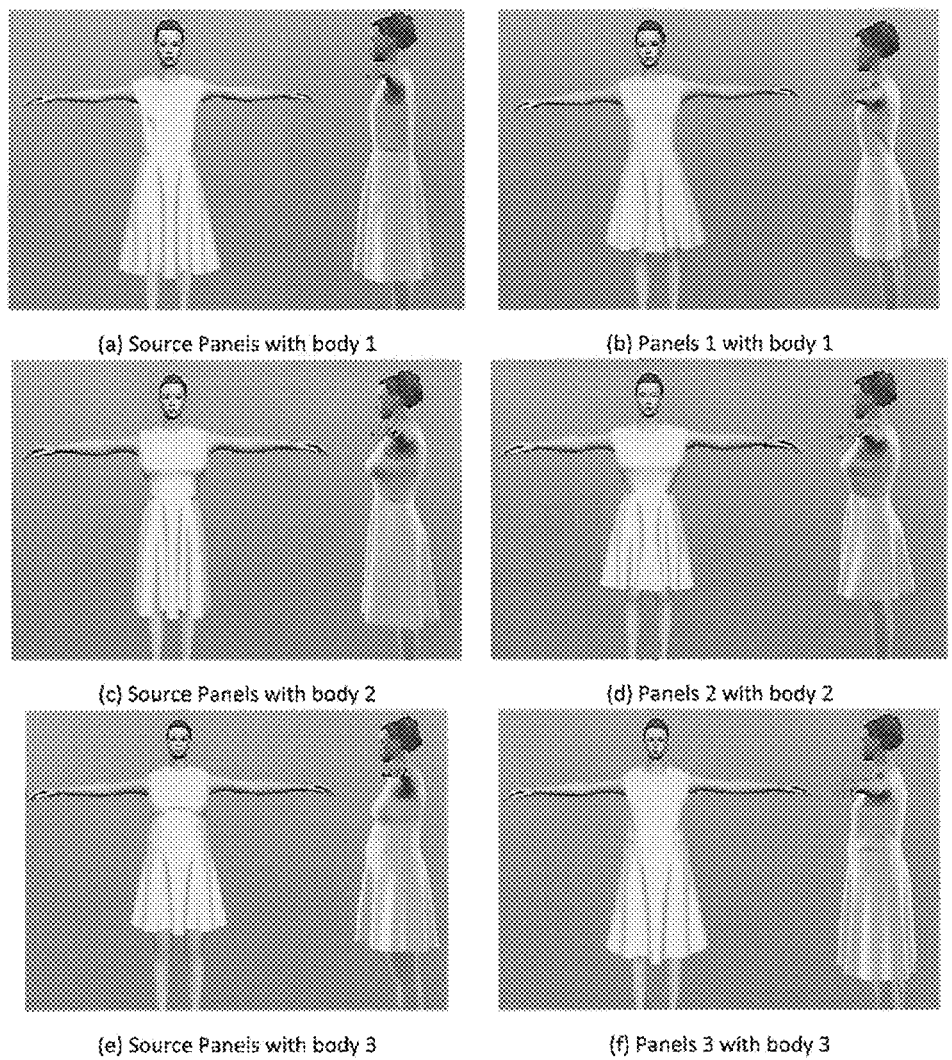
FIG. 18 is a diagram showing a draping source panels and graded panels to the target bodices: (a) The dress was too big for body 1. In addition, the skirt part was too long, so it was reached below the knees. (c) The dress was little tight around the bust, whereas it was loose around the waist. We observe that the skirt sagged to both sides. (e) The dress was too tight and short for body 3. The side opening of dress was disappeared. (b) The garment was properly reduced to fit the body 1. (d) the dress became loose around bust and tight around waist. Draping shape of the skirt was kept. (e) The side opening of dress was appeared.

FIG. 18a, FIG. 18c, FIG. 18e show the dresses did not fit to the target bodies. The dress was too loose or too tight about the each body. Moreover the shape of dress did not preserved. For example, FIG. 18c shows that the skirt sagged to both sides, FIG. 18e shows the side opening of dress was disappeared.

Through smart grading, source panels ware graded to fit target bodies. We observed that the graded dress properly fitted to the target bodies. FIG. 18d shows the shape of skirt was preserved. In the case of Body 3, the side opening was appeared as shown in FIG. 18f

6.4 Pressure Analysis

Figure 19:
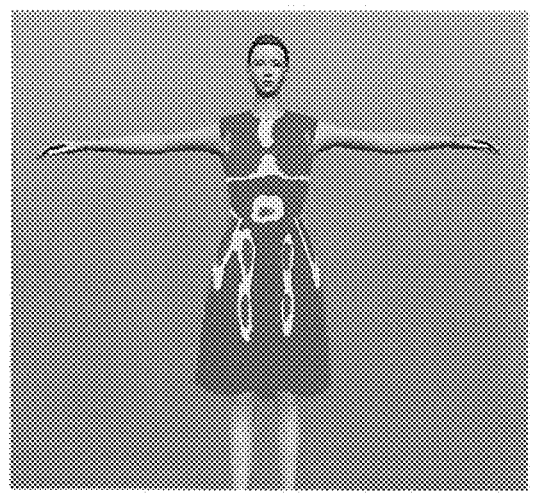
FIG. 19 is a diagram showing a pressure distribution map: represent pressure between vertex of garment and triangle of body mesh, Red: high pressure, Green: low pressure. Pressure was high around bust, shoulder and waist.
Figure 20:
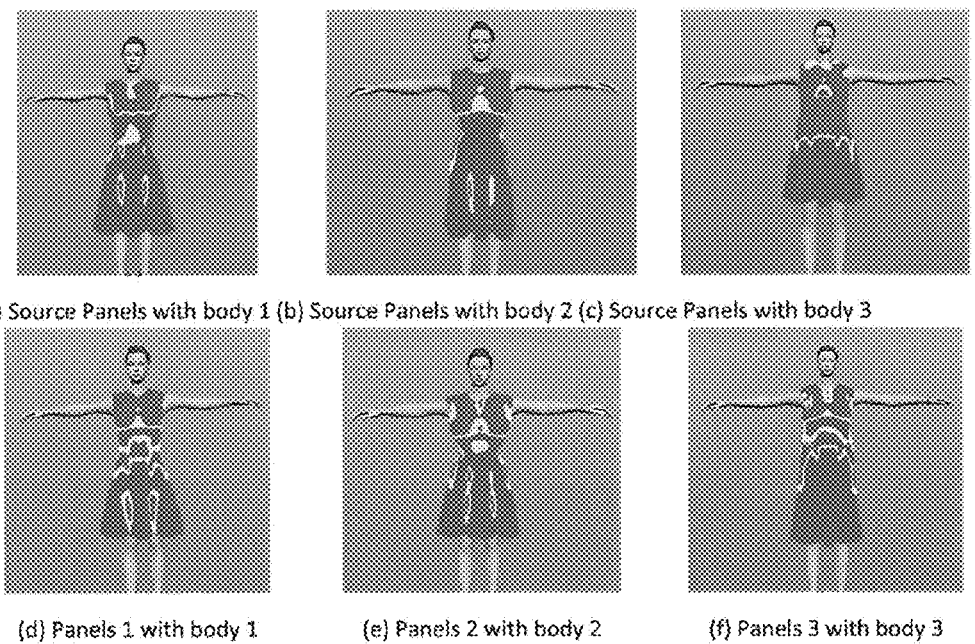
FIG. 20 is a diagram showing a pressure distribution map: (a) Around the waist and bust, pressure was lower than reference. (b) Pressure was low around waist, but it was high around bust. (c) Pressure had high value about whole upper body.

The pressure distribution map shows how garment fit to the body through. The pressure distribution map is expressed as color, red region represent high pressure and green region represent low pressure. In the case of source dress with source body, pressure was high around bust, shoulder and waist as shown in FIG. 19. Because, the garment was designed that it was tighten around bust and waist, also it hung on the shoulder.

Before grading, there are many differences between these pressure distribution maps as shown in the FIG. 19, FIG. 20a, FIG. 20b, FIG. 20c. After grading, each pressure distribution map of target bodies was similar to the source body's (FIG. 19) as shown in FIG. 20d, FIG. 20e, FIG. 20f. Although pressure distribution map of target bodies did not exactly same to target bodies, since the shape of target bodies was difference with source body.

6.5 Air-gap Analysis $$R_{Airgap} = \frac{A_{garment\ contour} - A_{body\ contour}}{A_{garment\ contour}} \quad (6.1)$$

Figure 21:
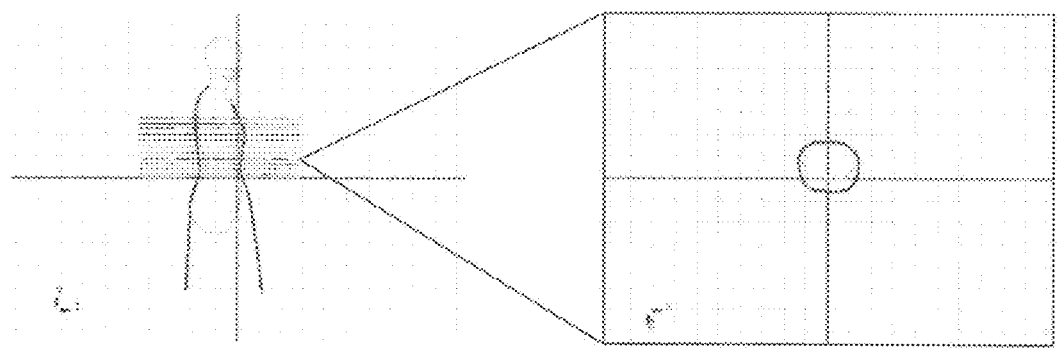
FIG. 21 is a diagram showing a Measuring Air-gap: (left) For air-gap analysis, we cut the draping result along perpendicular to the y-axis. We got the eleven cross-section sample. (right) Each crosssection shows garment contour (red) and body contour (gray). We measured the area of contour and distance between two vertices.
Figure 22:
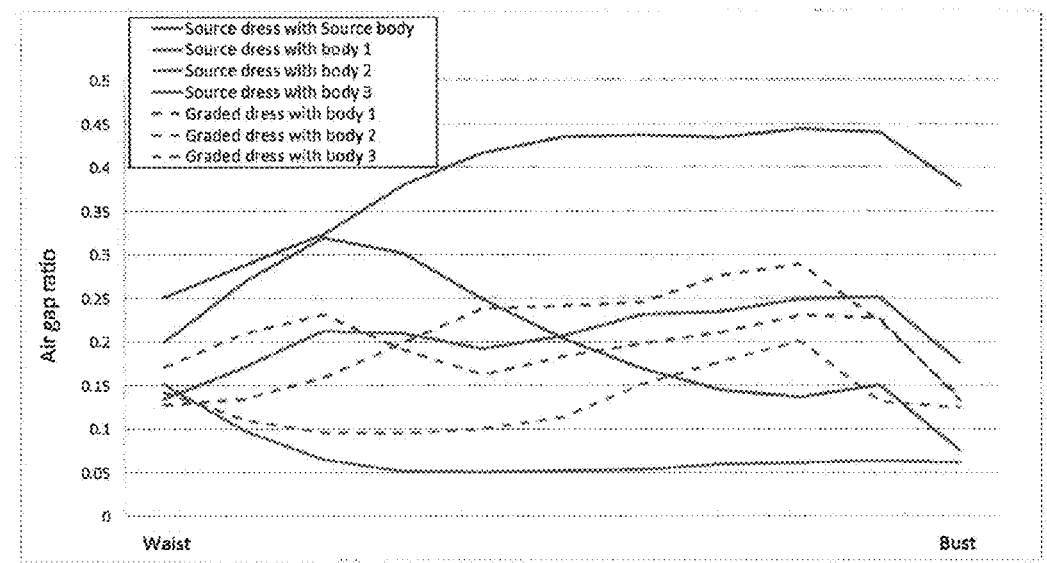
FIG. 22 is a diagram showing an airgap ratio graph.

Equation 6.1 defined air gap ratio. Air gap ratio is the proportion of the difference between area of body contour and garment to the area of garment contour, FIG. 21 shows body contour and garment contour. FIG. 22 shows air gap ratio. For air-gap analysis, we got eleven contour sample as shown in FIG. 21, and than we measured air-gap from waist to bust. Because, skirt parts did not relate of fitting and the cross section was not contour around shoulder since there was arm hole.

In the case of source dress with source body, air gap ratio was between 0.15 and 0.25 (red solid line). There had low value around waist and bust, so the graph shape likes arch.

But in the case of source dress with target bodies, air gap ratio got out the range (blue, green, violet solid line). Moreover, there are many difference between the graph forms. In the case of graded dress with target bodies, air gap ratio approximately got in the range (blue, green, violet dotted line), and these graph forms were similar to the graph of source dress with source bodies (red solid line).

6.6 Handling of Complex Garments

Figure 23:
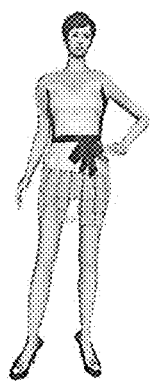
FIG. 23 is a diagram showing a Complex garment (minidress with sleeve): (a) Draping the minidress on the source body (b) Garment panels, It was composed of 6 front bodice panel, 6 back bodice panel, 4 front skirt panels, 4 back skirt panels, a belt panel, 2 sleeve panels and ribbon panels.
Figure 23:
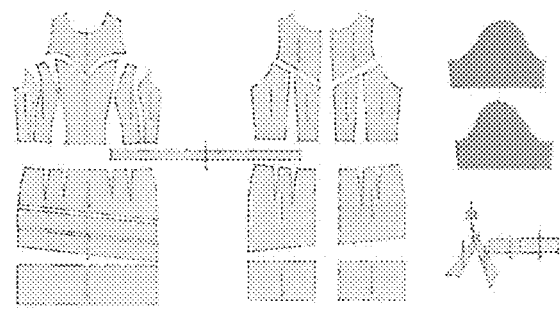
Figure 24:
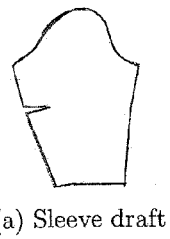
FIG. 24 is a diagram showing a Sleeve draft and PBS table: For generating sleeve panel, we need additional PBSs. The sleeve length in the table is the distance from shoulder to elbow.
Figure 25:
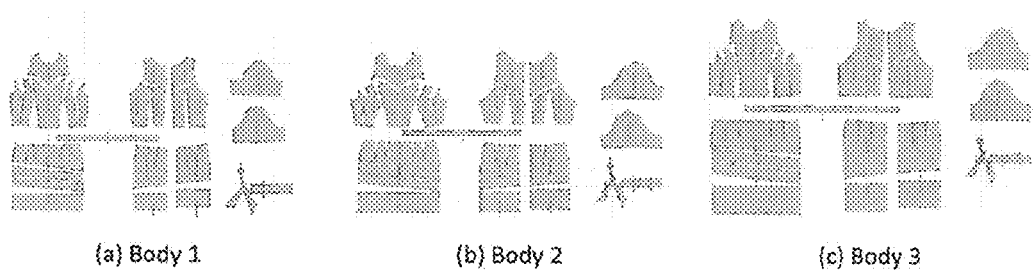
FIG. 25 is a diagram showing a graded garment panels.
Figure 26:
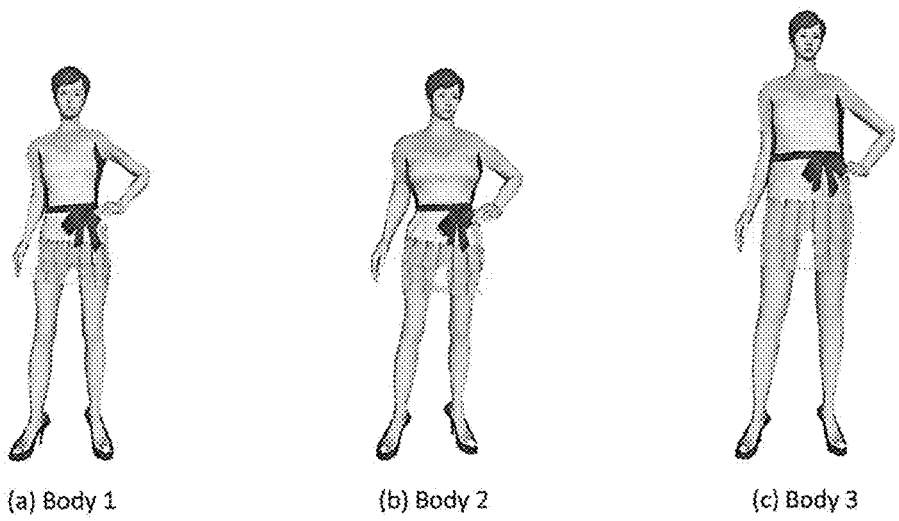
FIG. 26 is a diagram showing a draping graded garment on the target bodies.

We applied our method to the complex garment as shown in FIG. 23. This garment had sleeve, therefore we did grading to sleeve panels (dark gray panels in FIG. 23b). Although, the garment has ribbon panels, we did not grading to it since the ribbon is just an accessory. Needless to say, we needed sleeve draft and additional PBSs as shown in FIG. 24. Through smart grading, we took the graded panels as shown in FIG. 25. FIG. 26 shows that each graded panels well fitted to the each target body.

Chapter 7 Limitation and Discussion

Our method has two main limitations. First, we always need parameterized draft for using smart grading, since our method is based on draft. Fortunately, we can easily find proper parameterized draft, because general garment panels are made based on the draft which can serve as parameterized draft. Another limitation is discontinuity of our encoding method. It may make some artifact when panel is not positioned suitably, although we make it more smooth by using sub-divided algorithm.

The purpose of our research was to propose fast and accurate grading method. We considered that the 2D based grading is an appropriate approach. We introduced parameterized draft for the approach. Because, parameterized draft can be a good mediator on 2D based method. This draft always fit to the given body, also we can make easily by using draft constructor. Each point of garment panel is represented by linear combination of that draft, and the weight function was calculated according to OMVC. Since we take account of visibility for eliminating negativity, OMVC is appropriate method to do smart grading.

We did several analyses to validate our method. As discussed in silhouette analysis, smart grading preserved cloth properties such as side opening and shape of skirt. In the pressure and air-gap analysis, the results of target body did not exactly accord with source, since the shape of bodies was not same. However, these analysis show the graded garments well fit to the target body. For these reasons, our method satisfy the judging the quality of garment grading as presented in Section 3.3.

Chapter 8 Conclusion

We would easily perform grading through the new approach, even if we are not professional designers. Smart grading is composed of five steps, and these steps are simple and automatic. So our approach reduces difficult and tedious work in the garment grading. We can do grading for arbitrary body, not only linear grading, since the draft can be generated according to arbitrary PBSs. Since smart grading perform on the 2D, we do not go through conversing dimension steps such as physically-based simulation and pattern extraction. Therefore our approach is able to improve producing speed. Consequently, smart grading lead to minimizing knowledge intensive work and saving performing time for garment grading.

Future works Although OMVC well operate about grading, OMVC may cause error on account of discontinuity. Therefore, we will solve discontinuity of OMVC. parameterized draft is another limitation. In general, we can find proper parameterized draft. But once in a while, we handle the case which are given only garment panels. To solve these cases, we will devise the method which generate draft and PBSs from source garment panels.

BIBLIOGRAPHY

[1] A. Iserles, *A First Course in Numerical Analysis of Differential Equations*, Cambridge University Press, 1996.

[2] A. Jacobson, I. Baran, J. Popovi'c, O. Sorkine, "Bounded biharmonic weights for realtime deformation", *ACM Transactions on Graphics.*, vol. 30, Issues 4, Article No. 78, July 2011.

[3] A. Sheffer, E. Praun, K. Rose, "Mesh parameterization methods and their applications", *Foundations and Trends in Computer Graphics and Vision*, vol. 2, Issues 2, pp. 105 -171, January 2006.

[4] C. C. L. Wang, K. C. Hui, K. M. Tong, "Volume Parameterization for Design Automation of Customized Free-Form Products", *IEEE TRANSACTIONS ON AUTOMATION SCIENCE AND ENGINEERING.*, vol. 4, Issues 1, No. 1, January 2007.

[5] C. C. L. Wang, Y. Wang, M. M. F. Yuen, "Design automation for customized apparel products", *Computer-Aided Design.*, vol. 37, Issues 7, pp. 675 -691, June 2005.

[6] D. Baraff, A. Witkin, "Large steps in cloth simulation", in *Proceedings of SIGGRAPH* 1998, Computer Graphics Proceedings, ACM, pp. 43-54.

[7] E. L. Wachspress, *A Rational Finite Element Basisa*, Academic Press, New York, 1975.

[8] H. Hoppe, T. DeRose, T. Duchamp, J. McDonald and W. Stuetzle, "Mesh optimization", in *Proceedings of SIGGRAPH* 1993, Computer Graphics Proceedings, ACM, pp. 19-26.

[9] J. Warren, "Barycentric coordinates for convex polytopes", *Advances in Computational Mathematics.*, vol. 6, Issues 1, pp. 97-108, 1996.

[10] J. Warren, S. Schaefer, A. N. Hirani, M. Desbrun, "Barycentric coordinates for convex sets", *Advances in Computational Mathematics.*, vol. 27, Issues 3, pp. 319-338, October 2007.

[11] K. Hormann, M. S. Floater, "Mean value coordinates for arbitrary planar polygons", *ACM Transactions on Graphics.*, vol. 25, Issues 4, pp. 1424-1441, October 2006.

[12] K.-J. Choi, H.-S. Ko, "Stable but responsive cloth", in *Proceedings of SIGGRAPH* 2002, Computer Graphics Proceedings, ACM, pp. 604-611.

[13] M. Eck, T. DeRose, T. Duchamp, H. Hoppe, M. Lounsbery, W. Stuetzle, "Multiresolution analysis of arbitrary meshes", in *Proceedings of SIGGRAPH* 1995, Computer Graphics Proceedings. ACM, pp. 173-182.

[14] M. S. Floater, "Mean value coordinates", *Computer Aided Geometric Design.*, vol. 20, Issues 1, pp. 19-27, March 2003.

[15] M. Meyer, A. Barr, H. Lee and M. Desbrun, "Generalized Barycentric Coordinates on Irregular Polygons", *Journal of Graphics Tools.*, vol. 7, Issues 1, pp. 13 -1441, April 2002.

[16] N. Umetani, D. M. Kaufman, T. Igarashi and E. Grinspun, "Sensitive couture for interactive garment modeling and editing", *ACM Transactions on Graphics.*, vol. 30, Issues 4, Article No. 90, July 2011.

[17] P. Joshi, M. Meyer, T. DeRose, B. Green and T. Sanocki, "Harmonic coordinates for character articulation", *ACM Transactions on Graphics.*, vol. 26, Issues 3, Article No. 71, July 2007.

[18] P. Volino, F. Cordier, NM. Thalmann, "From early virtual garment simulation to interactive fashion design", *Computer-Aided Design.*, vol. 27, Issues 6, pp. 593-608, May 2005.

[19] R. Bridson, R. Fedkiw, J. Anderson, "Robust treatment of collisions, contact and friction for cloth animation", in *Proceedings of SIGGRAPH* 2002, Computer Graphics Proceedings, ACM, pp. 594-603.

[20] R. Brouet, A. Sheffer, L. Boissieux and M. P. Cani, "Design preserving garment transfer", *ACM Transactions on Graphics.*, vol. 31, Issues 4, Article No. 36, July 2012.

[21] R. Chase, *CAD for Fashion Design*, Cambridge University Press, 1996.

[22] R. Sibson, "A brief description of natural neighbour interpolation", *Interpolating Multivariate Data*, V. Barnett, Ed. Wileyvol, New York, pp. 21-36, 1981.

[23] T. Derose, M. Meyer, "Harmonic coordinates", Pixar Animation Studios, United states of america, Pixar Technical Memo 06-02, 2006.

[24] T. Langer, A. Belyaev, and H. P. Seidel, "Mean value coordinates for arbitrary spherical polygons and polyhedra in R3", *Curve and Surface Design: Avignon* 2006, Modern Methods in Applied Mathematics, pp. 193-202. Nashboro Press, Brentwood, Tenn., 2007.

[25] T. Ju, S. Schaefer, J. Warren, "Mean value coordinates for closed triangular meshes", *ACM Transactions on Graphics.*, vol. 24, Issues 3, pp. 561-566, July 2005.

[26] U. Pinkalla, K. Polthier, "Computing Discrete Minimal Surfaces and Their Conjugates", *Experimental Mathematics*, vol. 2, Issues 1, pp. 15-36, April 1993.

[27] Y. Lipman, J. Kopf, D. Cohen-Or, D. Levin, "GPU-assisted positive mean value coordinates for mesh deformations", in *Proceedings of Eurographics* 2007, Geometry Processing Proceedings, ACM, pp. 117-123.

[28] Y.-J. Liu, D.-L. Zhang, M. M.-F. Yuen, "A survey on CAD methods in 3D garment design", *Computers in Industry*, vol. 61, Issues 6, pp. 576-593, August 2010.

[29] Y. Meng, C. C. L. Wang, X. Jin, "Flexible shape control for automatic resizing of apparel products", *Computer-Aided Design.*, vol. 44, Issues 1, pp. 68 -76, January 2012.

What is claimed is:

1. A method of smart grading based on parameterized draft, the method comprising steps for:

constructing source drafts D(A), which is decided from primary body sizes (PBSs) of a source body A;

positioning a set of source panels P(A) on the source drafts D(A);

encoding draft-space by making correspondence between source draft vertices, $\mu_i$, and each panel vertex, $P_j$, wherein $P_j$ is represented by a linear combination of the source draft vertices $\mu_i$, $$P_j = \Sigma_{i=1}^{k} \lambda_i v_i, i \in D(A)$$

where $\lambda_i$ is a set of weight function obtained by using an omitted mean value coordinates (OMVC);

constructing a target draft D(B) having target draft vertices, $\hat{\mu}_i$, according to the PBSs of a target body B and designed to fit the target body B;

decoding draft-space by transferring the source panel vertices $P_j$ to fit the target draft D(B), obtaining graded panel vertices, $\hat{P}_j$, which are transferred through the linear combination of $\hat{\mu}_i$ with the same set of weight function $\lambda_i$ $$\hat{P}_j = \Sigma_{i=1}^{k} \lambda_i \hat{v}_i$$

as in the step for encoding draft-space; and storing the obtained graded panel vertices, $\hat{P}_j$ in an information storage device, wherein each of the drafts and the panels is two(2)-dimensional.

2. The method of claim 1, wherein the source drafts D(A) are parameterized drafts obtained using a draft constructor.

3. The method of claim 1, wherein the PBSs comprise bust circumference, waist circumference, hip circumference, waist back length, bust point to bust point, and neck point to breast point for constructing a parameterized draft for a bodice, wherein the PBSs comprise other predetermined sizes for constructing parameterized drafts for other body parts.

4. The method of claim 1, wherein each of the source panels is represented by a collection of points and lines on a given coordinate system.

5. The method of claim 1, wherein the source drafts D(A) are decided further from garment types and gender in addition to from the primary body sizes (PBSs) of the source body A.

6. A method of smart grading based on parameterized draft, the method comprising steps for:
constructing source drafts D(A), which is decided from primary body sizes (PBSs) of a source body A;
positioning a set of source panels P(A) on the source drafts D(A);
encoding draft-space by making correspondence between source draft vertices $v_i$, and each panel vertex, $P_j$, wherein $P_j$ is represented by a linear combination of the source draft vertices $v_i$, $$P_j = \Sigma_{i=1}^k \lambda_i v_i, i \in D(A)$$

where $\lambda_i$, is a set of weight function obtained by using an omitted mean value coordinates (OMVC);
constructing a target draft D(B) having target draft vertices, $\hat{v}_i$, according to the PBSs of a target body B and designed to fit the target body B;
decoding draft-space by transferring the source panel vertices $P_j$ to fit the target draft D(B), obtaining graded panel vertices, $\hat{P}_j$, which are transferred through the linear combination of $\hat{v}_i$, with the same set of weight function $\lambda_i$ $$\hat{P}_j = \Sigma_{i=1}^k \lambda_i \hat{v}_i$$

as in the step for encoding draft-space; and
storing the obtained graded panel vertices, $\hat{P}_j$ in an information storage device,
wherein each of the drafts and the panels is two(2)-dimensional,
wherein the omitted mean value coordinates (OMVC) is configured so that when a position P on a plane defined by vertices $(v_1, v_2, \ldots v_N)$ is encoded as a linear combination of the verices as $$P_j = \Sigma_{i=1}^N \lambda_i v_i$$

with $$\Sigma_{i=1}^N \lambda_i = 1$$

where $\lambda_i = 0$ if $v_i$ is invisible from the position P.

7. The method of claim 6, wherein the weight function $\lambda_i$ is calculated by a mean value coordinates scheme.

8. The method of claim 7, wherein when P, exterior to the plane, is located outside a convex hull and close to a draft vertex the method further comprising a step for extending the plane by introducing a ghost vertex such that P lies inside the extended plane and then applying the omitted mean value coordinates (OMVC).

9. The method of claim 8, wherein the ghost vertex is disposed at a position which is symmetric to the nearest vertex with respect to P.

10. The method of claim 7, wherein when P, exterior to the plane, is located outside a convex hull and close to an edge of the plane the method further comprising a step for extending the plane by introducing a ghost vertex $v_g$ such that P lies inside the extended plane and then applying the omitted mean value coordinates (OMVC).

11. The method of claim 10, wherein the ghost vertex is disposed at an inner-division vertex of a ghost edge $(v_x', v_y')$ which is point-symmetric to a spanning edge $(v_x, v_y)$ with respect to P, such that the ratio $(v_x', v_g):(v_y', v_g)$ is equal to the ratio $(v_x', P):(v_y', P)$.

* * * * *